United States Patent
Jialanella et al.

(10) Patent No.: US 10,392,539 B2
(45) Date of Patent: Aug. 27, 2019

(54) CRASH DURABLE EPOXY ADHESIVE COMPOSITIONS HAVING IMPROVED LOW-TEMPERATURE IMPACT RESISTANCE AND WASH OFF RESISTANCE

(71) Applicant: Dow Global Technologies LLC, Midland, MI (US)

(72) Inventors: Gary L. Jialanella, Oxford, MI (US); Andreas Lutz, Galgenen (CH); Eric E. Cole, Waterford, MI (US); Glenn G. Eagle, Bloomfield Hills, MI (US); Rajesh H. Turakhia, Lake Jackson, TX (US); Yanli Feng, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/509,877

(22) PCT Filed: Aug. 13, 2015

(86) PCT No.: PCT/US2015/044955
§ 371 (c)(1),
(2) Date: Mar. 9, 2017

(87) PCT Pub. No.: WO2016/108958
PCT Pub. Date: Jul. 7, 2016

(65) Prior Publication Data
US 2017/0292049 A1 Oct. 12, 2017

Related U.S. Application Data

(60) Provisional application No. 62/098,678, filed on Dec. 31, 2014.

(51) Int. Cl.
| | | |
|---|---|---|
| *C09J 163/00* | (2006.01) | |
| *C09J 5/06* | (2006.01) | |
| *C09J 11/02* | (2006.01) | |
| *C09J 175/04* | (2006.01) | |
| *C09J 153/00* | (2006.01) | |
| *C08L 63/00* | (2006.01) | |

(52) U.S. Cl.
CPC ............ *C09J 163/00* (2013.01); *C08L 63/00* (2013.01); *C09J 5/06* (2013.01); *C09J 11/02* (2013.01); *C09J 153/00* (2013.01); *C09J 175/04* (2013.01)

(58) Field of Classification Search
None
See application file for complete search history.

(56) References Cited

U.S. PATENT DOCUMENTS

| | | |
|---|---|---|
| 3,686,359 A | 8/1972 | Soldatos et al. |
| 4,734,332 A | 3/1988 | Bagga et al. |
| 5,112,932 A | 5/1992 | Koenig et al. |
| 5,202,390 A | 4/1993 | Mulhaupt et al. |
| 5,278,257 A | 1/1994 | Mulhaupt et al. |
| 6,884,854 B2 | 4/2005 | Schoenfeld et al. |
| 7,625,977 B2 | 12/2009 | Lutz et al. |
| 7,910,656 B2 | 3/2011 | Lutz et al. |
| 8,062,468 B2 | 11/2011 | Finter et al. |
| 8,076,424 B2 | 12/2011 | Kramer et al. |
| 8,404,787 B2 | 3/2013 | Lutz et al. |
| 2005/0070634 A1 | 3/2005 | Lutz et al. |
| 2006/0276601 A1* | 12/2006 | Lutz ............... C08G 18/10 525/528 |
| 2007/0027274 A1* | 2/2007 | Antelmann ........ C08G 59/4021 525/523 |
| 2010/0009196 A1* | 1/2010 | Kramer ............ C08G 18/10 428/413 |
| 2011/0030893 A1* | 2/2011 | Kramer ............ C08G 18/10 156/281 |
| 2011/0114257 A1* | 5/2011 | Kramer ............ C08L 63/00 156/281 |
| 2011/0294963 A1 | 12/2011 | Kuan et al. |

FOREIGN PATENT DOCUMENTS

| | | | |
|---|---|---|---|
| EP | 1728825 B1 | 3/2010 | |
| WO | 2005097893 A1 | 10/2005 | |
| WO | 2005118734 | 12/2005 | |
| WO | 2006052725 A1 | 5/2006 | |
| WO | 2006052726 A1 | 5/2006 | |
| WO | 2006052727 A1 | 5/2006 | |
| WO | 2006052728 A1 | 5/2006 | |
| WO | 2006052729 A1 | 5/2006 | |
| WO | 2006052730 A1 | 5/2006 | |
| WO | 200931179 A | 3/2009 | |
| WO | 200953357 A | 4/2009 | |
| WO | WO-2015042823 A1 * | 4/2015 | .............. C08L 63/00 |

OTHER PUBLICATIONS

Li, et al., "Engineering Superior Toughness in Commercially Viable Block Copolymer Modified Epoxy Resin", Journal of Polymer Science: Polymer Physics, 54, 189-204, published online Sep. 16, 2015. (Year: 2015).*

Adams, "Adhesive Bonding: Science, Technology and Applications" pp. 360-361, Mar. 8, 2005. (Year: 2005).*

* cited by examiner

*Primary Examiner* — Christopher M Rodd
(74) *Attorney, Agent, or Firm* — M. Robert Christy

(57) ABSTRACT

Aspects of the present invention provide a one component epoxy adhesive composition having improved impact resistance at low temperatures, such as −40° C. or less. In a first aspect, the adhesive includes one or more epoxy resins; at least one polyurethane based toughener; at least one amphipathic block copolymer; and one or more epoxy curing agents. In a further, aspect epoxy adhesive compositions having improved wash off resistance are also provided.

16 Claims, No Drawings

CRASH DURABLE EPOXY ADHESIVE COMPOSITIONS HAVING IMPROVED LOW-TEMPERATURE IMPACT RESISTANCE AND WASH OFF RESISTANCE

FIELD

The present invention relates generally to impact modifiers, and in particular, to thermosetting epoxy resins having improved low-temperature impact resistance, and improved wash-off resistance.

BACKGROUND

Epoxy resin based adhesives are used to bond a variety of different substrates together.

In certain applications, the adhesive must maintain good bonding to the substrate and good impact resistance over a very wide temperature range. For example, epoxy resin adhesives are used in the automotive industry in metal-metal bonding in frame and other structures. Adhesive bonding can reduce the number of welds that are needed to construct the frame, and for that reason, the use of these adhesives can reduce assembly costs. The adhesive will be subjected to a very wide range of temperatures during subsequent manufacturing processes and during the lifetime of the vehicle. These temperatures may be as high as 80° C. Automobiles that are used in cold climates may be exposed to temperatures as low as −40° C.

Structural adhesives potentially offer similar advantages in aerospace manufacturing as they do in the automotive sector, such as reduced vehicle weight and reduced manufacturing costs. However, aircraft are routinely exposed to temperatures as low as −60 to −70° C. when they operate at altitudes of 30,000 feet or more, which is common in the industry. Structural adhesives used in these applications must retain adequate adhesion and impact resistance at these temperatures.

Many structural adhesives used in automotive applications are based on a rubber-modified epoxy resin and a reactive "toughener". Structural adhesives of these types are described in, for example, U.S. Pat. Nos. 5,202,390, 5,278, 257, WO 2005/118734, U.S. Published Patent Application No. 2005/0070634, U.S. Published Patent Application No. 2005/0209401, U.S. Published Patent Application 2006/ 0276601 and EP-A-0 308 664. Unfortunately, these structural adhesives tend to exhibit a substantial drop in performance at temperatures of −40° C. or below. It would be desirable to provide a structural adhesive that has good adhesive and impact properties, and which retains those properties better at temperatures as low as −60 to −70° C.

U.S. Patent Publication No. 2011/0114257 describes an impact modifier containing carboxylic acid group(s), which is prepared from the reaction of an intramolecular anhydride of a di- or tricarboxylic acid with at least one amphiphilic block copolymer containing at least one hydroxyl group. The impact modifier is blended with an epoxy resin and is purported to provide improvements in impact resistance at temperatures above or approaching −40° C.

In WO 2005/007720 and U.S. 2007/0066721, an adhesive system is described which contains a polytetrahydrofuran-based toughener based on polytetrahydrofuran (PTHF, also known as polytetramethylene glycol, PTMEG, polytetramethylene oxide, and PTMO). WO 2005/007720 and U.S. 2007/0066721 describe tougheners based on PTHF polymers having various molecular weights. In those systems, the molecular weight of the PTHF is reported to have little impact on adhesive properties.

However, there still exists a need for adhesive compositions having improved impact resistance at temperatures near and below −40° C.

SUMMARY

Embodiments of the present invention comprise a one component adhesive composition that may help overcome one or more of the foregoing discussed problems. In particular, embodiments of the invention provide an epoxy adhesive composition having improved impact resistance at low temperatures, such as −40° C. or less. Preferably, a composite structure prepared with the adhesive has an impact peel strength of at least 15 N/mm at a temperature of −40° C., wherein the impact peel strength is measure in accordance with ISO 11343 wedge impact method.

In one embodiment composite structures prepared with the inventive epoxy adhesive composition may have impact peel strengths of at least 13 N/mm at a temperature of −40° C., wherein the impact peel strength is measure in accordance with ISO 11343 wedge impact method, and preferably at least 15 N/mm, and more preferably, at least 20 N/mm.

In a first aspect, the present invention provides a one component epoxy adhesive composition comprising one or more epoxy resins; at least one polyurethane based toughener; at least one amphipathic block copolymer (also known as amphiphilic block copolymer); and one or more epoxy curing agents.

In one embodiment, the epoxy resin includes at least one diglycidyl ether of a bisphenol. The amount of epoxy may be from about 30 to 60 weight percent, based on the total weight of the epoxy adhesive composition.

In one embodiment, the polyurethane based toughener includes aliphatic diisocyanate groups that are blocked or capped with one or more of Bisphenol A or diisopropyl amine. Preferably, the polyurethane based toughener is a reaction product of an aliphatic diisocyanate and a polyol having a molecular weight ranging between 2,000 and 12,000 Daltons. The amount of polyurethane may range from about 10 to 25 weight percent, based on the total weight of the epoxy adhesive composition In one embodiment, the amphiphilic block copolymer comprises a block copolymer of one or more of ethylene oxide and propylene oxide and at least one further alkylene oxide containing at least four C atoms. Preferably, the alkylene oxide block comprises butylene oxide.

The amount of amphiphilic block copolymer may range from about 2 to 14 weight percent, based on the total weight of the epoxy adhesive composition.

In some embodiments, the epoxy adhesive composition may comprise at least one filler, such as mineral fillers, glass particles, and fused silica. The adhesive may also include curing promoting and accelerating agents.

A further aspect of the invention is also directed to a composite structure comprising a first substrate, a second substrate, and a cured epoxy adhesive composition of the invention that adhesively bonds the first and second substrates together. The substrates may be the same material or comprise materials that are different from each other. For example, in one embodiment, the first and second substrates may both be metal. In other embodiments, one of the first and second substrates is metal, and the other substrate is plastic.

Aspects of the invention are also directed to methods of joining materials. In one embodiment, a method is provided comprising applying the inventive epoxy adhesive composition to surfaces of two substrates, and curing the epoxy adhesive composition to form an adhesive bond.

Aspects of the invention also provide a one component epoxy adhesive composition having improved wash off resistance when subjected to an e-bath treatment. In one embodiment, an epoxy adhesive composition having improved wash off resistance is provided in which the composition comprises one or more epoxy resins; at least one polyurethane based toughener; at least one epoxy functionalized amphipathic block copolymer; and one or more epoxy curing agents.

Preferably, the epoxy adhesive composition having improved wash off resistance has a viscosity of less than 300 pascal second, more preferably a viscosity from 225 to 300 pascal second, such as from 245 to 280 pascal second, from 250 to 275 pascal second, and from 260 to 270 pascal second.

In one embodiment, the epoxy adhesive composition exhibits an improvement in wash off resistance in comparison to a similar adhesive composition that does not include an epoxy functionalized amphipathic block copolymer. In some embodiments, the epoxy adhesive composition exhibits a wash off resistance of less than 20% as measured as the percent difference between the adhesive composition and an epoxy formulation having a viscosity greater than 350 pascal second when subjected to an indirect impingement spray test. In particular, embodiments of the present invention exhibit an adhesive wash off resistance of less than 20% when subjected to the e-coat bath treatment, and in particular, less than 18%, and more particularly, less than 15%, and even more particularly, less than 12% as measured as the percent difference between an epoxy formulation having a viscosity greater than 350 pascal second and the inventive formulation when subjected to the indirect impingement spray test.

In some embodiments, the epoxy functionalized amphipathic block copolymer comprises a reaction product between a carboxylic or hydroxyl terminated ethylene oxide-butylene oxide block copolymer and an epoxy resin.

DETAILED DESCRIPTION

As discussed previously, embodiments of the present invention are directed to an epoxy based adhesive composition comprising one or more epoxy resins; at least one polyurethane based toughener; at least one amphipathic block copolymer; and one or more epoxy curing agents.

Epoxy Resin

The epoxy adhesive composition contains at least one epoxy resin. All or part of the epoxy resin may be present in the form of a rubber-modified epoxy resin, as discussed more below. A wide range of epoxy resins can be used, including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by The Dow Chemical Company under the designations D.E.R.® 330, D.E.R.® 331, D.E.R.® 332, D.E.R.® 383, D.E.R.® 661 and D.E.R.® 662 resins.

Commercially available diglycidyl ethers of polyglycols include those sold as D.E.R.® 732 and D.E.R.® 736 by The Dow Chemical Company.

Epoxy novolac resins may also be used. Such resins are available commercially as D.E.N.® 354, D.E.N.® 431, D.E.N.® 438 and D.E.N.® 439 from The Dow Chemical Company.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure I:

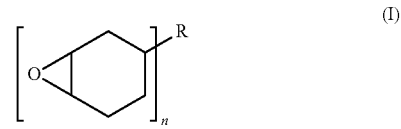

wherein R is an aliphatic, cycloaliphatic and/or aromatic group and n is a number from 1 to 10, preferably from 2 to 4. When n is 1, the cycloaliphatic epoxide is a monoepoxide. Di- or epoxy resins are formed when n is 2 or more. Mixtures of mono-, di- and/or epoxy resins can be used. Cycloaliphatic epoxy resins as described in U.S. Pat. No. 3,686,359 may be used in embodiments of the present invention. Cycloaliphatic epoxy resins of particular interest are (3,4-epoxycyclohexyl-methyl)-3,4-epoxy-cyclohexane carboxylate, bis-(3,4-epoxy-cyclohexyl) adipate, vinylcyclohexene monoxide and mixtures thereof.

Other suitable epoxy resins may include oxazolidone-containing compounds as described in U.S. Pat. No. 5,112,932. In addition, an advanced epoxy-isocyanate copolymer such as those sold commercially as D.E.R.® 592 and D.E.R.® 6508 (Dow Chemical) can be used.

The epoxy resin preferably is a bisphenol-type epoxy resin or mixture thereof with up to 10 percent by weight of another type of epoxy resin. Preferably the bisphenol type epoxy resin is a liquid epoxy resin or a mixture of a solid epoxy resin dispersed in a liquid epoxy resin. The most preferred epoxy resins are bisphenol-A based epoxy resins and bisphenol-F based epoxy resins.

An especially preferred epoxy resin is a mixture of a diglycidyl ether of at least one polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 600. The proportions of the two types of resins are preferably such that the mixture of the two resins has an average epoxy equivalent weight of from 225 to 400. The mixture optionally may also contain up to 20%, preferably up to 10%, of one or more other epoxy resin.

In embodiments of the present invention, the epoxy resin may include at least about 10 weight percent, based on the total weight of the epoxy adhesive composition, preferably at least about 15 weight percent, and most preferably at least about 20 weight percent, based on the total weight of the epoxy adhesive composition. In some embodiments, the epoxy resin preferably comprises up to about 70 weight percent of the epoxy adhesive composition, more preferably up to about 60 weight percent, and most preferably up to about 50 weight percent, based on the total weight of the epoxy adhesive composition.

Amphipathic Block Copolymer

The amphipathic block copolymer preferably comprises a copolymer having at least one block segment that is miscible or partially miscible with the epoxy resin, and at least one block segment which is immiscible with epoxy resin. Examples of block segments which are miscible in epoxy resin include in particular polyethylene oxide, polypropylene oxide, poly(ethylene oxide-co-propylene oxide), and poly(ethylene oxide-ran-propylene oxide) blocks, and mixtures thereof.

Examples of block segments immiscible in epoxy resin may include in particular polyether blocks prepared from alkylene oxides which contain at least four C atoms, preferably butylene oxide, hexylene oxide, and/or dodecylene oxide. Examples of block segments that are immiscible in epoxy resin also may include in particular oxides of polyethylene, polyethylene-propylene, polybutadiene, polyisoprene, polydimethylsiloxane, and polyalkyl methacrylate blocks and mixtures thereof.

In a preferred embodiment, the amphiphilic block copolymer comprises a block copolymer of ethylene oxide and/or propylene oxide and at least one further alkylene oxide containing at least four C atoms, preferably from the group comprising butylene oxide, hexylene oxide, and dodecylene oxide.

In some embodiments, the amphiphilic block copolymer is selected from the group comprising poly(isoprene block-ethylene oxide) block copolymers (PI-b-PEO), poly(ethylene-propylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-methyl methacrylate) block copolymers (PI-b-PEO-b-PMMA), and poly(ethylene oxide)-b-poly(ethylene-alt-propylene) block copolymers (PEO-PEP).

The amphiphilic block copolymers may be present in particular in diblock, triblock, or tetrablock form. For multiblocks, i.e., in particular for tri- or tetrablocks, these may be present in linear or branched, in particular in star block, form. Preferably, the amphiphilic block copolymers are terminated with hydroxyl or carboxyl acid groups.

Examples of amphiphilic block copolymers that may be used in embodiments of the invention include those described in WO 2006/052725 A1, WO 2006/052726 A1, WO 2006/052727 A1, WO 2006/052728 A1, WO 2006/052729 A1, WO 2006/052730 A1, or WO 2005/097893 A1. A particularly preferred class of amphiphilic block copolymers is available from The Dow Chemical Company under the product name FORTEGRA™.

The amount of the amphiphilic block copolymer in the adhesive composition generally ranges from about 1 to 10 weight percent, based on the total weight of the adhesive composition, and in particular, from about 5 to 8, and more particularly, from about 6 to 7 weight percent, based on the total weight of the adhesive composition.

Polyurethane Based Toughener

In one embodiment, the polyurethane based toughener comprises a polyurethane polymer that is a reaction product of a polyol and an aliphatic diisocyanate, such as 1,6 hexane diisocyanate and isophorone diisocyanate. Preferably, polyurethane based tougheners in accordance with the present invention include end groups that are either reactive toward the epoxy curatives, or are removed so that the isocyanate groups are available to react with the epoxy curatives.

Examples of diisocyanates that may be used in the preparation of the polyurethane polymer include aromatic diisocyantes, toluene diisocyanate (TDI) and methylene diphenyl diisocyanate, MDI, aliphatic and cycloaliphatic isocyanates, such as 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane, ($H_{12}$MDI or hydrogenated MDI).

The polyol component may comprise polyether polyols, which are made by the reaction of epoxides with an active hydrogen containing starter compounds, or polyester polyols, which are made by the polycondensation of multifunctional carboxylic acids and hydroxyl compounds.

In one embodiment, the isocyanate groups of the polyurethane-based toughener may be capped or blocked with an end group, such as a phenolic compound, an aminophenolic compound, carboxylic acid group, or hydroxyl group. Preferred capping groups include phenolic compounds, such as bisphenol-A, or diallyl bisphenol-A and diisopropylamine.

In order for the adhesive composition to have a desired impact resistance at low temperatures (e.g., at and below −40° C.), it has been discovered that it is preferable that the polyurethane toughener comprise a polyol component having good flexibility.

In particular, it has been discovered that polyol components having relatively high molecular weights may provide improved flexibility. In one embodiment, the polyol may have a molecular weight ranging between 2,000 and 12,000 Daltons, and in particular, between 3,000 and 10,000. In one embodiment, it may be desirable for the polyol component to comprise polyether chains having at least 4 consecutive carbon atom between each pair of ether groups, or polyols comprising hydrocarbon chains, or mixtures thereof may provide the desired flexibility. In one embodiment, the polyol comprises a polyether chain having from 4 to 12 consecutive carbon atoms between each pair of ether groups, and preferably having from 4 to 8 consecutive carbon atoms between each pair of ether groups.

The polyol component of the polyurethane based toughener may range from about 70 to 90 weight percent, based on the total weight of the polyurethane based toughener. Preferably, the polyol component of the polyurethane based toughener is from about 72 to 88 weight percent, and more preferably, from about 75 to 85 weight percent, based on the total weight of the polyurethane based toughener.

Examples of urethane based tougheners that may be used in embodiments of the present invention include a hydroxyl capped polyurethane available under the product name INT LMB 6333 FLEXIBILIZER, and available from The Dow Chemical Company, and a diisopropylamine capped urethane available under the product name RAM DIPA, which is also available from The Dow Chemical Company.

The amount of the polyurethane based toughener generally ranges from about 10 to 25 weight percent, based on the total weight of the epoxy adhesive composition, and in particular, from about 10 to 20, and more particularly, from about 14 to 18 weight percent, based on the total weight of the epoxy adhesive composition. For example, in embodiments of the present invention the adhesive may include up to about 25, up to about 20, up to about 18, up to about 16, or up to about 14 weight percent, of the polyurethane based toughener, based on the total weight of the epoxy adhesive composition.

Additional Components

The epoxy adhesive composition further contains a curing agent. The curing agent is selected together with any catalysts such that the adhesive cures when heated to a temperature of 80° C., preferably at least 100° C. or greater, but cures very slowly if at all at room temperature (about 22° C.) and at temperatures up to at least 50° C. Such suitable curing agents include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The curing agent is used in sufficient amount to cure the composition. The curing agent suitably constitutes at least about 1.5 weight percent of the epoxy adhesive composition, and more preferably at least about 2.5 weight percent. The curing agent preferably constitutes up to about 15 weight percent of the epoxy adhesive composition, more preferably up to about 10 weight percent, and most preferably up to about 6 weight percent.

The epoxy adhesive composition will in most cases contain a catalyst for the cure of the adhesive. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethyl-aminomethyl)phenol, piperidine or derivates thereof, imidazole derivates, in general $C_1$-$C_{12}$ alkylene imidazole or N-arylimidazols, such as 2-ethyl-2-methyl-imidazol, or N-butylimidazol, 6-caprolactam, a preferred catalyst is 2,4,6-tris(dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures. Preferably, the catalyst is present in the epoxy adhesive composition in the amount of at least about 0.1 weight percent of the structural adhesive, and most preferably about 0.2 weight percent. Preferably, the epoxy curing catalyst is present in an amount of up to about 2 weight percent of the structural adhesive, more preferably up to about 1.0 weight percent, and most preferably about 0.7 weight percent. Another optional component is a bisphenol compound that has two or more, preferably two, phenolic hydroxyl groups per molecule. Examples of suitable bisphenol compounds include, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol and the like. The bisphenol component can be dissolved into the epoxy adhesive composition or present in the form of finely divided particles. Preferably, the bisphenol component is pre-reacted with an epoxy resin (which may include a rubber-modified epoxy resin, if present) to advance the resin somewhat.

If used, the bisphenol component is preferably used in an amount from about 3 to about 35 parts by weight per 100 parts by weight of the rubber component. A preferred amount is from about 5 to about 25 parts by weight per 100 parts by weight of the rubber component. When the bisphenol component is added directly into the structural adhesive, it usually constitutes from 0.25 to 2 weight percent, especially 0.4 to 1.5 weight percent, of the epoxy adhesive composition.

The epoxy adhesive composition of the invention may contain various other optional components. Among these, fillers, rheology modifiers or pigments, one or more additional epoxy resins and a core-shell rubber are particularly preferred.

A filler, rheology modifier and/or pigment is preferably present in the epoxy adhesive composition. These can perform several functions, such as (1) modifying the rheology of the epoxy adhesive composition in a desirable way, (2) reducing overall cost, (3) absorbing moisture or oils from the epoxy adhesive composition or from a substrate to which it is applied, and/or (4) promoting cohesive, rather than adhesive, failure. Examples of these materials include calcium carbonate, calcium oxide, talc, coal tar, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Among these, calcium carbonate, talc, calcium oxide, fumed silica and wollastonite are preferred, either singly or in some combination, as these often promote the desired cohesive failure mode.

The epoxy adhesive composition can further contain other additives such as diluents, plasticizers, extenders, pigments and dyes, fire-retarding agents, thixotropic agents, flow control agents, thickeners such as thermoplastic polyesters, gelling agents such as polyvinylbutyral, adhesion promoters and antioxidants.

Fillers, rheology modifiers, gelling agents, thickeners and pigments preferably are used in an aggregate amount of about 5 weight percent, based on the total weight of the adhesive composition or greater, more preferably about 10 weight percent of the epoxy adhesive composition or greater. In one embodiment, such components may preferably be present in an amount of up to about 25 weight percent of the epoxy adhesive composition, more preferably up to about 20 weight percent.

The epoxy adhesive composition can be applied by any convenient technique. It can be applied cold or be applied warm if desired. It can be applied by extruding it from a robot into bead form on the substrate, it can be applied using manual application methods such as a caulking gun, or any other manual application means. The epoxy adhesive composition can also be applied using jet spraying methods such as a steaming method or a swirl technique. The swirl technique is applied using an apparatus well known to one skilled in the art such as pumps, control systems, dosing gun assemblies, remote dosing devices and application guns. The epoxy adhesive composition may be applied to the substrate using a streaming process. Generally, the epoxy adhesive composition is applied to one or both substrates. The substrates are contacted such that the epoxy adhesive composition is located between the substrates to be bonded together.

After application, the epoxy adhesive composition may be cured by heating to a temperature at which the curing agent initiates cure of the epoxy resin in the epoxy adhesive composition. Generally, this temperature is about 80° C. or above, preferably 100° C. or above. Preferably, the temperature is about 220° C. or less, and more preferably about 180° C. or less.

The epoxy adhesive composition of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Adhesion to brittle metals such as steel coated with galvaneal is of particular interest in the automotive industry. Galvaneal tends to have a zinc-iron surface that is somewhat rich in iron content and is brittle for that reason. A particular advantage of this invention is that the cured epoxy adhesive composition bonds well to metals with a brittle coating, such as galvaneal. Another application of particular interest is the bonding of aerospace components, particularly exterior metal components or other metal components that are exposed to ambient atmospheric conditions during flight.

The epoxy adhesive composition once cured preferably has a Young's modulus of about 1000 MPa as measured according to DIN EN ISO 527-1. More preferably, the Young's modulus is about 1200 MPa or greater. Preferably, the cured epoxy adhesive composition demonstrates a tensile strength of about 25 MPa or greater, more preferably about 30 MPa or greater, and most preferably about 35 MPa or greater. Preferably, the lap shear strength of a 1.5 mm thick cured adhesive layer is about 15 MPa or greater, more preferably about 20 MPa or greater, and most preferably about 25 MPa or greater measured according to DIN EN 1465.

In a further aspect, embodiments of the present invention provide an epoxy adhesive composition having improved wash off resistance when subjected to an e-coat bath treatment.

In the automotive industry, it is common to subject assembled structural components to an e-coat bath in order to improve corrosion resistance of the assembled vehicle. In many cases, the solution in the e-coat bath will remove some of the adhesive joining structural components together. This is undesirable for several reasons. First, removal of adhesive may reduce the strength of the assembled structure. Second, the presence of the adhesive in the e-coat bath solution will result in contamination of the bath, which requires more frequent replacement of the e-coat solution in the bath. Previously, epoxy adhesive formulations have been developed having higher viscosities that are more resistant to removal during the e-coat bath treatment. However, higher viscosity based adhesives are more difficult to apply, and also tend to exhibit a significant reduction in shelf-life.

The inventors of the present invention have found that the inclusion of an epoxy functionalized amphiphilic block copolymer into the epoxy adhesive composition improves resistance to adhesive removal during the e-coat bath treatment. In particular, embodiments of the present invention exhibit an adhesive wash-off resistance of less than 20% when subjected to the e-coat bath treatment, and in particular, less than 18%, and more particularly, less than 15%, and even more particularly, less than 12% as measured as the percent difference between an epoxy formulation having a viscosity greater than 350 pascal second and the inventive formulation when subjected to the "indirect impingement spray" test.

In particular, embodiments of the present invention having an epoxy functionalized amphiphilic block copolymer provide improvements in wash off resistance in comparison to similar or identical compositions that did not include the epoxy functionalized amphiphilic block copolymer.

As used herein, the indirect impingement spray test comprises depositing a bead of an epoxy formulation (8 mm×125 mm) onto a panel. A stream of fluid (e.g., water) is then sprayed at the panel and is aimed to hit the panel 1 cm above the adhesive bead for 20 seconds. Movement of the bead is then measured at three locations and an average value is determined. This procedure is performed for the control and inventive formulations and the percent differences between the control and inventive formulations are determined.

In a preferred embodiment, the epoxy functionalized amphiphilic block copolymer comprises a reaction product between a carboxylic or hydroxyl terminated ethylene oxide-butylene oxide block copolymer and an epoxy resin, such as diglycidyl ethers of polyhydric phenol compounds. Examples of such epoxy resins include diglycidyl ethers of bisphenol A, such as are sold by Dow Chemical under the designations D.E.R.® 330, D.E.R.® 331, D.E.R.® 332, D.E.R.® 383, D.E.R.® 661 and D.E.R.® 662 resins. In a preferred embodiment, the epoxy functionalized amphiphilic block copolymer is a reaction product between a carboxylic terminated ethylene oxide-butylene oxide block copolymer sold under the trademark FORTEGRA® 202, and an epoxy resin sold under the designation D.E.R.® 331, both of which are available from The Dow Chemical Company.

Preferably, the resulting epoxy adhesive composition has a viscosity less than 300 pascal second (300 k centipoise), and more preferably, a viscosity ranging from 225 to 300 pascal second, such as from 245 to 280 pascal second, from 250 to 275 pascal second, and from 260 to 270 pascal second.

To achieve the desired viscosity, it is important that the molecular weight of the epoxy functionalized amphiphilic block copolymer be from about 5,000 g/mole to 20,000 g/mole, and more preferably 8,000 g/mole to 16,000 g/mole.

The amount of the epoxy functionalized amphiphilic block copolymer in the epoxy adhesive composition generally ranges from about 10 to 20 weight percent, based on the total weight of the epoxy adhesive composition, and in particular, from about 12 to 18, and more particularly, from about 12 to 16 weight percent, based on the total weight of the epoxy adhesive composition.

The inventors have also discovered that in embodiments directed to improved wash off resistance, it may also be desirable to include a filler, such as the fillers previously mentioned above. For example, suitable fillers may include calcium carbonate, calcium oxide, talc, coal tar, carbon black, textile fibers, glass particles, fibers, or spheres, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Among these, hollow glass spheres are preferred, either singly or in some combination with other filler components.

EXAMPLES

In the following Examples, a one-component epoxy adhesive composition in accordance with embodiments of the invention was prepared and evaluated in comparison to a comparative adhesive that did not include an amphiphilic block copolymer. The comparative adhesive also contained a rubber component. The inventive epoxy adhesive composition and comparative examples were subjected to an impact peel test and a T-Peel failure mode test to assess to evaluate the low temperature impact resistance of the inventive adhesive composition.

The materials used in the adhesive compositions are identified below. All percentages are weight percents unless indicated otherwise. All physical property and compositional values are approximate unless indicated otherwise.

"EPDXY-1", refers to an epoxy that is a diglycidyl ether of bisphenol A, and is available under the trademark DER® 330 from The Dow Chemical Company.

"EPDXY-2", refers to an epoxy that is a diglycidyl ether of bisphenol A, and is available under the trademark DER® 331 from The Dow Chemical Company.

"EPDXY-3", refers to solid epoxy that is a low molecular weight solid reaction product of epichlorohydrin and bisphenol A, and is available under the trademark DER® 661 from The Dow Chemical Company.

"EPDXY-4", refers to an epoxy diluent that is a diglycidyl ether of a polyglycol, and is available under the trademark DER® 732 from The Dow Chemical Company.

"PU-1": refers to a polyurethane based toughener composed of a hydroxyl capped polyurethane prepolymer available under the product name INT LMB 6333 FLEXIBILIZER, available from The Dow Chemical Company.

"PU-2": refers to a polyurethane based toughener composed of a diisopropylamine capped polyurethane prepolymer available under the product name RAM DIPA 20003, available from The Dow Chemical Company.

"PU-3": refers to a polyurethane polyol available from Huntsman Chemicals under the product name Flexibilizer DY 965 (RAM 965).

"EO-BO": refers to a carboxylic terminated ethylene oxide-butylene oxide block copolymer available under the trademark FORTEGRA® 202, which is available from The Dow Chemical Company.

"EP-EO-BO": refers to an epoxy functionalized carboxylic terminated ethylene oxide-butylene oxide block copolymer that is a reaction product of FORTEGRA® 202 and DER® 331, both of which are available from The Dow Chemical Company. An excess of DER® 331 is reacted in a ratio of 40% w/w of FORTEGRA® 202 and 60% w/w of DER® 331. "PB" refers to a polyvinyl butyral that is available from Kuraray Co., Ltd under the product name MOWITAL® 60HH.

"CA-1": refers to a commercially available dicyandiamide epoxy curing agent available under the trademark AMICURE® CG-1200, available from Air Products and Chemicals, Inc.

"CA-2": refers to a commercially available blocked phenolic-amine curing accelerator available under the trademark EPCAT® 50, available from The Dow Chemical Company.

"CA-3": refers to a tris (2,4,6-dimethylamniomethyl)phenol catalyst in a polymer matrix available from Huntsman Chemicals.

"ESA-1": refers to an epoxy functional silane adhesion promoter available under the trademark SILQUEST® 187, and available Momentive.

"CSR": refers to a dispersion of core-shell rubber in epoxy resin, supplied by Kaneka, and available under the product name Kane Ace MX 152.

"Elastomer": refers to an adduct of diglycidyl ether of bisphenol A and a butadiene acrylonitrile elastomer, sold under the product name Int 170300 STUKTOL® 3604, and available from The Dow Chemical Company.

"CF": refers to a chlorite mineral filler available from Imerys under the product name Sierralite 252 Mistrufil HF.

"TF": refers to a talc filler available from Imerys under the product name Talc 156/Talc1N.

"COF-1": refers to a calcium oxide filler available from Mississippi Lime Co., under the product name Quicklime/Chaux Vive.

"COF-2": refers to a calcium carbonate mineral filler available from Imerys Performance Material under the tradename ATOMITE™.

"ATF": refers to an aluminum trihydrate filler available from J.M. Huber under the trademark ONYX ELITE® 805.

"GM": refers to glass microspheres available from Potters Industries under the product name QCe17028.

"WF": refers to a wollastonite filler available from NYCO under the product name NYAD® 400.

"FS": refers to medium surface area fused silica having a polydimethylsiloxane modified surface, available from Cabot Corporation under the product name Cab-O-Sil TS720.

"PIG-1": refers to a chlorinated Cu-pthalocyanine green pigment available from BASF under the trademark HELIOGEN GREEN® K 8730.

"PIG-2": refers to a blue pigment dispersed in an epoxy resin available from Huntsman Chemicals.

"PIG-3": refers to a red pigment dispersed in an epoxy resin available from Huntsman Chemicals.

"PIG-4": refers to a violet pigment dispersed in an epoxy resin available from Plasticolors, Inc. under the product name ED-70572.

"NS-1": refers to distilled cashew nutshell oil, available from Cardanol Chemicals under the product name Cardolite NC-700.

"NS-2": refers to cashew nutshell oil, available from Cardanol Chemicals under the product name Cardolite N-10.

"GS": refers to glass spheres for bond gap control, which are available from Potters Industries under the product name PQ GB Spheriglass 2429 CP00.

Inventive Example 1 and Comparative Example 1, set forth below were prepared with a dual asymmetric centrifugal FlackTek SpeedMixer® DAC 400 FVZ by Hauschild Engineering according to the following procedure.

The resins and tougheners were added to the Speed mixing cup to which the liquid components were added. This was mixed for 1 minute at 2,200 rpm. The solids, except the catalyst, were then added and the composition was mixed for 3 minutes at 2,200 rpm. The sides of the mixing cup were scraped down and the composition was cooled to below 50° C. The catalyst was added to the Speed Mixing cup and speed mixed for 1 minute at 2,200 rpm. The composition was then added to a dual planetary Ross Mixer and mixed for 20 minutes at the slowest speed at a temperature of 40° C. and under vacuum.

TABLE 1

Composition of Examples and Comparative Examples

| Component | Inventive Example 1 (weight %) | Inventive Example 2 (weight %) | Comparative Example 1 (weight %) | Comparative Example 2 (weight %) | Comparative Example 3 (weight %) | Comparative Example 4 (weight %) |
|---|---|---|---|---|---|---|
| EPOXY-1 | 53.9 | 54.4 | 55.9 | 53.7 | 54.4 | 36.2 |
| EPOXY-2 | — | — | — | — | — | — |
| PU-1 | 6 | — | — | 6.4 | — | — |
| PU-2 | 6 | — | — | 6.4 | — | — |
| PU-3 | — | 17.2 | 24.3 | — | 17.2 | — |
| EO-BO | 8 | 7.9 | — | — | — | — |
| CA-1 | 4.4 | 5.1 | 5.1 | 4.4 | 5.1 | 5.1 |
| CA-2 | 0.7 | — | — | 0.7 | — | — |
| CA-3 | — | 0.75 | 0.75 | — | 0.75 | 0.75 |
| ESA-1 | 0.2 | 0.68 | 0.68 | 0.2 | 0.68 | 0.68 |
| ELASTOMER | — | — | — | 7.4 | 7.9 | 45.0 |
| CSR | — | — | — | — | — | — |
| CF | 1.5 | — | — | 1.5 | 1.5 | — |
| TF | 0.2 | — | — | 0.2 | — | — |
| COF-1 | 5 | 3.59 | 3.59 | 5 | 3.59 | 3.59 |
| COF-2 | — | 3.59 | 3.59 | — | 3.59 | 3.59 |
| ATF | 6 | — | — | 6 | — | — |
| GM | 1 | — | — | 1 | — | — |
| FS | 6 | 3.65 | 3 | 6 | 3.65 | 2 |
| PIG-1 | 0.1 | — | — | 0.1 | — | — |
| GS | 1 | — | — | 1 | — | — |
| NS-1 | — | 1.97 | 1.97 | — | 1.97 | 1.97 |
| NS-2 | — | 1.13 | 1.13 | — | 1.13 | 1.13 |

The Inventive and Comparative Examples were then evaluated for impact resistance at low-temperature. To perform this evaluation, 3 test samples for each adhesive composition were prepared. The samples were prepared and evaluated in accordance with the procedures set forth below.

T-Peel Coupon Preparation

T-Peel specimens were prepared and tested according to the ASTM Standard ASTM D1876. The substrate used was 0.8 mm thick GMC-5E cold rolled steel supplied by ACT Laboratories, Inc. Test coupons were cut into 1 inch×4 inch strips and 1 inch of the 4 inch length was bent at a 90° angle. The 3 in² bonding overlap section of each coupon was cleaned with acetone. The adhesive was applied to the bonding section of the coupon and 10 mil glass bead spacers were applied on top to control the bond gap. Another coupon was laid on top and the specimen was assembled. The edges of the assembly were scraped clean using a spatula and held together with clips while curing for a 30 minute, 170° C. bake cycle in a programmable Blue M Electric Oven programmed with repeatable heat up and cool down cycles.

T-Peel Testing

The average load per unit of bond width was measured using an Instron® 5500R Materials Testing System (Instron Corporation). Mechanical grips were used to hold the T-Peel samples in place. The distance between the grips was two inches. The crosshead speed was 50 mm/min. The computer measured the load as a function of crosshead displacement and loads were converted to Newtons of force per mm of bond width. After each T-Peel specimen was tested to failure, a failure mode was assigned by visual evaluation. Failure modes were classified as either Adhesive Failure or Cohesive Failure and given a number ranking with a number system with 100% Adhesive Failure being assigned a 1 and 100% Cohesive Failure being assigned a 5.

Impact Peel Coupon Preparation

Impact Peel specimens were prepared and tested according to the ISO Standard ISO 11343. The substrate used was 0.8 mm thick GMC-5E cold rolled steel supplied by ACT Laboratories, Inc. Test coupons were cut into 20 mm×100 mm strips. 10 mil thick Teflon tape was applied to the end and middle of one coupon marking off the bonding area of 20 mm×30 mm. The bonding section of each coupon was cleaned with Acetone. The adhesive was applied to the bonding section of the coupon and another coupon was laid on top to assemble the specimen. The edges of the assembly were scraped clean using a spatula and held together with clips while curing for a 30 minute 170° C. bake cycle in a programmable Blue M Electric Oven programmed with repeatable heat up and cool down cycles. After curing, the bonded section of the assembly was marked and clamped in a vice. The free ends were bent by hand to allow the insertion of a wedge for impact testing.

Impact Peel Testing

Impact testing was performed with an Instron Dynatup Crush Tower in accordance with ISO 11343 wedge impact method. The specimens were placed inverted on a fixed wedge. The crosshead with the load cell and 50 lb. weight attached was dropped from a fixed height at a velocity of 6.7 ft/s. The cleavage force was measured and converted to N/mm of bond line. Specimens tested at −40° C. were condition for 1 hour in a freezer set to −43° C. and then immediately tested at room temperature. This procedure reproducibly insures that the adhesive and coupon are at −40° C. at the instant of impact.

The results of the testing are summarized in Table 2 below.

TABLE 2

Impact Peel, T-Peel, and failure mode

| Sample No. | Impact Peel at room temperature (N/mm) | Impact Peel at −40° C. (N/mm) | T-Peel (N/mm) | Failure mode |
|---|---|---|---|---|
| Inventive Example 1 | 23.1 | 13.6 | 8.1 | 5 |
| Comparative Example 2 | 20.7 | 5.7 | 7.7 | 3 |
| Inventive Example 2 | 38.7 | 32.9 | — | — |
| Comparative Example 1 | — | 27 | — | — |

TABLE 2-continued

Impact Peel, T-Peel, and failure mode

| Sample No. | Impact Peel at room temperature (N/mm) | Impact Peel at −40° C. (N/mm) | T-Peel (N/mm) | Failure mode |
|---|---|---|---|---|
| Comparative Example 3 | 35 | 26 | — | — |
| Comparative Example 4 | — | 1 | — | — |

In the above examples, Inventive Example and Comparative Example 2 were formulated to compare the difference in impact peel and T-Peel by replacing an elastomer component with an amphipathic block copolymer. From this comparison, it can be seen that the amphipathic block copolymer provides improvement in both peel strength and T-Peel.

Inventive Example 2 was prepared and compared to Comparative Examples 1, 3, and 4. In particular, the formulation of Comparative Example 1 did not include an amphipathic block copolymer, but rather only included a polyurethane. From this comparison, it is evident that the composition comprising a combination of one or more epoxy resins, at least one polyurethane based toughener, and at least one amphipathic block copolymer provides improvements in impact peel strength over the formulations of the comparative examples.

The examples show that the inventive adhesive can be used to prepare composite structures having impact peel strengths of at least 13 N/mm at a temperature of −40° C., wherein the impact peel strength is measure in accordance with ISO 11343 wedge impact method, and preferably at least 15 N/mm, and more preferably, at least 20 N/mm.

The T-peel test as with any adhesion test must exhibit the appropriate failure mode and strength. Original equipment auto manufacturers, OEMs, demand that all test specimens exhibit cohesive failure, which is failure in the adhesive matrix. Interfacial failure (adhesive failure) is unacceptable. The T-peel test using cold rolled steel is one of the most difficult tests to attain cohesive failure, even more difficult than the impact peel test. For this reason, the automotive OEMs examine the failure mode for this test very closely.

In comparing Inventive Example 1 to Comparative Example 2, it is seen that the comparative formulation suffered an adhesive failure mode that reflects an interfacial failure between the adhesive in the substrate. In contrast, the T-peel test of Inventive Example 1 showed that the adhesive suffered a failure mode resembling of cohesive failure of the adhesive. This is indicative that Inventive Example 1 provides improvements in impact resistance.

E-Bath Wash Off Resistance

In the following examples, an epoxy composition having an epoxy functionalized amphiphilic block copolymer was prepared and evaluated in comparison to several comparative formulations that did not include the epoxy functionalized amphiphilic block copolymer. The inventive epoxy adhesive composition and comparative examples were subjected to an e-bath treatment and then evaluated to determine the amount of adhesive removed during the wash treatment.

A control epoxy formulation was prepared that comprised an epoxy resin, a polyurethane based toughener, an elastomeric component, and filler components. The Control formulation was selected based on the formulation's high viscosity (e.g., greater than 350 pascal second) and resulting e-wash off resistance.

Examples A-H were prepared that comprised an epoxy base formulation to which either an epoxy functionalized amphiphilic block copolymer (Examples A-D), or an amphiphilic block copolymer (Examples E-H) were added. The epoxy base formulation included an epoxy resin, a polyurethane based toughener, fillers, and an epoxy curing agents.

TABLE 3

Epoxy Formulations for Preparation of Samples A-H

| Component | Control Epoxy Formulation (weight %) | Epoxy Base Formulation (weight %) |
|---|---|---|
| Epoxy-2 | 42.76 | 34.05-52.6 |
| Epoxy-4 | 2.4 | — |
| Elastomer | 10 | — |
| PU-1 | 25 | 8 |
| PU-2 | — | 8 |
| ESA-1 | 7.37 | 0.2 |
| CA-1 | 4.6 | 5 |
| CA-2 | 1.2 | 1.1 |
| TF | 1.55 | — |
| COF-1 | 4 | 5 |
| COF-2 | — | 4 |
| ATF | 2.3 | 1 |
| FS | 5.7 | 6 |
| PIG-2 | 0.06 | — |
| PIG-3 | 0.23 | — |
| PIG-4 | — | 0.1 |

The epoxy base formulation of Table 3 was t used to prepare the 8 epoxy formulations (Examples A-H in Table 4 below). Samples A-D included the epoxy functionalized amphiphilic block copolymer, whereas Examples E-H included an amphiphilic block copolymer that was not functionalized with an epoxy.

The epoxy formulations in Table 4 were prepared with a dual asymmetric centrifugal FlackTek SpeedMixer® DAC 400 FVZ by Hauschild Engineering using the following procedure. In a first step, the resin and rubber components were added to a speed mixing cup to which the liquid components were then added. The added components were then mixed with the speed mixer for 1 minute at 2,200 rpm. Next, the solid components were added with the exception of the catalyst component, and then mixed for 3 minutes at 2,200 rpm. The sides of the mixing cup were scraped down and the mixture was cooled below 50° C. The catalyst was then added and speed mixed for 1 minute at 2,200 rpm. The resulting mixture was then mixed in a dual planetary Ross Mixer for 20 minutes at the slowest speed at 40° C. and 25 in Hg vacuum to de-air.

The thus prepared epoxy formulations were then evaluated for wash off resistance and viscosity.

TABLE 4

Composition of Examples and Comparative Examples for E-Wash Evaluation

| Component | Control (wt. %) | Example A (wt. %) | Example B (wt. %) | Example C (wt. %) | Example D (wt. %) | Example E (wt. %) | Example F (wt. %) | Example G (wt. %) | Example H (wt. %) |
|---|---|---|---|---|---|---|---|---|---|
| Control Epoxy Formulation* | 100 | — | — | — | — | — | — | — | — |
| Epoxy Base Formulation* | — | 82.15 | 84.9 | 81.4 | 82.5 | 91 | 91 | 89 | 87.37 |
| EP-EO-BO | — | 12.1 | 12.1 | 16.5 | 15 | — | — | — | — |
| WF | — | 4 | — | — | — | — | — | — | — |
| GM | — | 1.75 | 3 | 2.1 | 2.5 | 1.75 | 1.75 | 2.25 | 2.25 |
| EO-BO | — | — | — | — | — | 7.25 | 7.25 | 7.25 | 7.25 |
| PB | — | — | — | — | — | — | — | 1.5 | — |
| EPOXY-3 | — | — | — | — | — | — | — | — | 3.13 |

*From TABLE 3.

Viscosities of the formulations in Table 4 were evaluated according to a simple steady shear rate flow test with a TA Instruments AR2000EX Stress Controlled Rheometer. A 25 mm parallel plate geometry was used with an initial gap setting of 475 μm. Adhesive squeeze out was then removed and the gap was set to 450 μm to maintain a consistent sample volume. Sample testing temperature was maintained at 38° C. using the Peltier temperature control plate capable of 0.01° C. resolution. A Peak Hold Flow Test was run at a shear rate of 3 1/s for 4 minutes with sampling every 10 seconds. The viscosity was taken at 3 minutes where steady state was achieved.

The formulations in Table 4 were then evaluated for e-bath wash off resistance. The wash off resistance was conducted with a Dow Automotive spray tank designed for adhesive wash off testing. A spray nozzle that provided a fan shaped spray pattern was used. The nozzle was 3.7 mm wide by 2.8 mm high. The water temperature was maintained at 50° C. with a fluid pressure set at 275 kPa. An 8 mm by 125 mm adhesive bead was applied to a 10.2 cm by 30.5 cm hot dipped galvanized steel panel cleaned with Acetone. The bead was formed using a trowel heated to 50° C. with an 8 mm diameter half circle cut into the trowel. The spray was aimed to hit 1 cm above the adhesive bead for "indirect impingement spray" and was timed at 20 seconds of spray for each test. The initial bead position was pre-marked allowing for measurement of the movement of the bead. The bead movement was measured in mm at three locations, 25 mm from the ends and in the middle, and an average value was taken. Three panels of each adhesive were run inter mixing the order. The width of the bead and other measurements taken after testing were measured with a micrometer after baking the panel in a forced air oven at 160° C. for 15 minutes to cure the adhesive. The average bead movement distance was then compared to the control formulation and a percent difference was calculated to quantify the wash off resistance.

Thus, the e-bath wash off resistance of the inventive formulations is determined as a percent difference in movement of a bead of cured adhesive in comparison to the movement of a similar sized bead of a control formulation having a viscosity greater than 350 pascal second when subjected to an indirect impingement spray of water as described above. The results are summarized in Table 5 below.

TABLE 5

Viscosity and Wash Off Resistance

| Sample | Steady Shear Viscosity (Pascal second)** | Wash off % difference from Control Formulation |
|---|---|---|
| Control | 361 | 0 |
| Control | 339 | 24 |
| Control | 392 | 0 |
| Example A | 247 | 13 |
| Example B | 268 | 11 |
| Example C | 268 | 1 |
| Example D | 266 | 9 |
| Example E | 242 | 68 |
| Example F | 267 | 64 |
| Example G | 385 | 68 |
| Example H | 326 | 110 |

**3 1/s, 38° C.

The Control Formulation of Tables 3-5 was selected based on its high viscosity (greater than 350 pascal second) and e-bath wash resistance. In contrast to the Control epoxy formulation, an object of the invention is to provide an epoxy adhesive formulation having a relatively low viscosity (less than 300 pascal second) while having a wash off resistance as measured by the percent difference in movement of a bead of the inventive composition, and a bead of similar size Control formulation when subjected to an indirect impingement spray. Ideally, epoxy formulations in accordance with the present invention will exhibit a percent difference of less than 20%, and in particular, less than 15%.

From Table 5, above, it can be seen that Examples A-D, which included the epoxy functionalized amphipathic block copolymer had viscosities less than 350 pascal second, and a percent difference in wash off resistance of less than 20%. In particular, Examples A-D exhibited a viscosity ranging between 247 and 266 pascal second, and a percent difference between 1 and 13. In contrast, Examples E-H, which included an amphipathic block copolymer, but did not include an epoxy functionalized amphipathic block copolymer exhibited viscosities ranging between 242 and 326, and a percent difference in comparison to the control that is between 64 and 110%. Thus, the epoxy formulations that did not include an epoxy functionalized amphipathic block copolymer did not provide the improvements in wash off resistance.

The invention claimed is:

1. A one-component adhesive composition comprising:
   one or more epoxy resins;
   at least one polyurethane based toughener containing aliphatic diisocyanate groups that are blocked or capped with bisphenol A or diisopropyl amine;
   at least one epoxy functionalized amphiphilic block copolymer having a molecular weight from 5,000 g/mole to 20,000 g/mole; and
   one or more epoxy curing agents,
   wherein the adhesive composition has a viscosity of less than 300 pascal second, and exhibits an improvement in wash off resistance in comparison to a similar adhesive composition that does not include an epoxy functionalized amphiphilic block copolymer.

2. The adhesive of claim 1, wherein the one or more epoxy resins includes at least one diglycidyl ether of a bisphenol.

3. The adhesive of claim 1, wherein the amount of the one or more epoxy resins is from about 30 to 60 weight percent, based on the total weight of the adhesive composition.

4. The adhesive of claim 1, wherein polyurethane based toughener is a reaction product of an aliphatic diisocyanate and a polyol having a molecular weight ranging between 2,000 and 12,000 Daltons.

5. The adhesive of claim 1, wherein the amount of polyurethane based-toughener is from about 10 to 25 weight percent, based on the total weight of the adhesive composition.

6. The adhesive of claim 1, wherein the amphiphilic block copolymer comprises a block copolymer of one or more of ethylene oxide and propylene oxide and at least one further alkylene oxide containing at least four C atoms.

7. The adhesive of claim 6, wherein the further alkylene oxide comprises butylene oxide.

8. The adhesive of claim 1, wherein the amount of amphiphilic block copolymer is from about 2 to 14 weight percent, based on the total weight of the adhesive composition.

9. The adhesive of claim 1, further comprising at least one filler.

10. The adhesive of claim 9, wherein the filler is selected from the group consisting of mineral fillers, glass particles, and fused silica.

11. The adhesive composition of claim 1, wherein the epoxy functionalized amphiphilic block copolymer comprises a reaction product between a carboxylic or hydroxyl terminated ethylene oxide-butylene oxide block copolymer and an epoxy resin.

12. The adhesive composition of claim 1, wherein the amphiphilic block copolymer is a block copolymer of ethylene oxide and butylene oxide.

13. The adhesive composition of claim 12, wherein the one or more epoxy curing agents are selected from one or more of dicyandiamide, isophthalic acid dihydrazide, adipic acid dihydrazide and 4,4'-diaminodiphenylsulphone.

14. The adhesive composition of claim 13, further comprising a latent catalyst.

15. The adhesive composition of claim 1 wherein:
   30 to 60 weight percent, based on the weight of the adhesive, is at least one diglycidyl ether of a bisphenol A;
   the polyurethane-based toughener contains aliphatic isocyanate groups capped with bisphenol A and diisopropyl amine and is present in an amount of 10 to 25 weight percent, based on the weight of the adhesive;
   the amphiphilic block copolymer is a block copolymer of ethylene oxide and butylene oxide, contains hydroxyl or carboxylic acid groups and is present in an amount of 2 to 14 weight percent, based on the weight of the adhesive;
   the one or more epoxy curing agents are selected from one or more of dicyandiamide, isophthalic acid dihydrazide, adipic acid dihydrazide and 4,4'-diaminodiphenylsulphone;
   the adhesive composition further comprises a latent catalyst.

16. The adhesive composition of claim 1 wherein:
   30 to 60 weight percent, based on the weight of the adhesive, is at least one diglycidyl ether of a bisphenol A;
   the polyurethane-based toughener contains aliphatic isocyanate groups capped with bisphenol A and diisopropyl amine and is present in an amount of 10 to 25 weight percent, based on the weight of the adhesive;
   the amphiphilic block copolymer is an epoxy-functional block copolymer of ethylene oxide and butylene oxide and is present in an amount of 10 to 20 weight percent, based on the weight of the adhesive;
   the one or more epoxy curing agents are selected from one or more of dicyandiamide, isophthalic acid dihydrazide, adipic acid dihydrazide and 4,4'-diaminodiphenylsulphone;
   the adhesive composition further comprises a latent catalyst.

* * * * *